United States Patent
Kim et al.

(10) Patent No.: US 9,073,013 B2
(45) Date of Patent: Jul. 7, 2015

(54) SEPARATION MEMBRANE, HYDROGEN SEPARATION MEMBRANE INCLUDING SEPARATION MEMBRANE, AND DEVICE INCLUDING HYDROGEN SEPARATION MEMBRANE

(71) Applicant: SAMSUNG ELECTRONICS CO., LTD., Suwon-si, Gyeonggi-do (KR)

(72) Inventors: Kwang Hee Kim, Seoul (KR); Hyeon Cheol Park, Hwaseong-si (KR); Jae-Ho Lee, Yongin-si (KR); Eun Seog Cho, Yongin-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 14/057,225

(22) Filed: Oct. 18, 2013

(65) Prior Publication Data
US 2014/0112836 A1 Apr. 24, 2014

(30) Foreign Application Priority Data

Oct. 18, 2012 (KR) .................. 10-2012-0115856
Feb. 5, 2013 (KR) .................. 10-2013-0013070

(51) Int. Cl.
*B01D 53/22* (2006.01)
*B01D 71/02* (2006.01)
*C01B 3/50* (2006.01)

(52) U.S. Cl.
CPC ............ *B01D 71/022* (2013.01); *B01D 53/228* (2013.01); *B01D 2255/10* (2013.01); *B01D 2257/108* (2013.01); *C01B 3/503* (2013.01); *C01B 2203/0405* (2013.01)

(58) Field of Classification Search
CPC ............... B01D 53/228; B01D 71/002; B01D 2256/16; B01D 2257/108; C01B 3/503
USPC ........ 96/4, 8, 10, 11; 95/55, 56; 422/187, 222
See application file for complete search history.

(56) References Cited

U.S. PATENT DOCUMENTS

| 6,066,592 | A  | * | 5/2000  | Kawae et al. ............ 95/56 |
| 2004/0129135 | A1 | * | 7/2004  | Roark et al. ............ 95/55 |
| 2005/0241477 | A1 | * | 11/2005 | Mundschau et al. ........ 95/56 |
| 2007/0240566 | A1 | * | 10/2007 | Benn et al. ............. 95/56 |

FOREIGN PATENT DOCUMENTS

| JP | 2008-055295 A | 3/2008 |
| KR | 1020110049707 A | 5/2011 |

OTHER PUBLICATIONS

Dolan, M.D., "Non-Pd BCC alloy membranes for industrial hydrogen separation", Journal of Membrane Science, 2010, vol. 362, pp. 12-28.*
A. G. Kanpton, "Palladium Alloys for Hydrogen Diffusion Membranes", Platinum Metals Rev., vol. 21 (2), 1977, pp. 44-50.
Buxbaum et al, "Hydrogen transport through non-porous membranes of palladium-coated niobium, tantalum and vanadium", Journal of Membrane Science, vol. 85, 1993, pp. 29-38.

(Continued)

*Primary Examiner* — Jason M Greene
(74) *Attorney, Agent, or Firm* — Cantor Colburn LLP

(57) ABSTRACT

A separation membrane including: an alloy including a Group 5 element, Fe, and Al, wherein the alloy includes a body-centered cubic lattice structure.

17 Claims, 12 Drawing Sheets

(56) References Cited

OTHER PUBLICATIONS

Dolan et al., "Hydrogen transport through V85Ni10M5 alloy membranes", Journal of Membrane Science, vol. 373. 2011, pp. 14-19.
Fukai et al., "Diffusion of hydrogen in metals", Advances in Physics, vol. 34, No. 2, 1985, pp. 263-326.
H. Wipf, "Solubility and diffusion of Hydrogen in Pure Metals and Alloys", Physica Scripta. T94, 2001, pp. 43-51.
Jimenez et al., "The role of hydrogen-exposure temperature on the mechanical properties of hydrogen-cycled palladium", Scripta Materialia, vol. 59, 2008, pp. 870-873.
M.D. Dolan, "Non-Pd BCC Ally membranes for industrial hydrogen separation", J. Membrane Science 362, 12-28, 2010.
Morreale et al., "The permeability of hydrogen in bulk palladium at elevated temperatures and pressures", Journal of Membrane Science, vol. 212, 2003, pp. 87-97.
Nathan W. Ockwig et al., "Membranes for Hydrogen Separation", Chem. Rev. vol. 107, 2007, pp. 4078-4110.
Nishimura et al., "Hydrogen permeation and transmission electron microscope observations of V-Al alloys", Journal of Alloys and Compounds, 356-357, 2003, pp. 295-299.
Ozaki et al., "Hydrogen permeation characteristics of V-Ni-Al alloys", International Journal of Hydrogen Energy, vol. 28, 2003, pp. 1229-1235.
Yun et al., "Correlations in palladium membranes for hydrogen separation: A review", Journal of Membrane Science, vol. 375, 2011, pp. 28-45.
Zhang et al., "Hydrogen permeation characteristics of vanadium-aluminium alloys", Scripta Materialia, vol. 47, 2002, pp. 601-606.

\* cited by examiner

US 9,073,013 B2

SEPARATION MEMBRANE, HYDROGEN SEPARATION MEMBRANE INCLUDING SEPARATION MEMBRANE, AND DEVICE INCLUDING HYDROGEN SEPARATION MEMBRANE

CROSS-REFERENCE TO RELATED APPLICATION

This application claims priority to and the benefit of Korean Patent Application No. 10-2012-0115856, filed on Oct. 18, 2012, and Korean Patent Application No. 10-2013-0013070, filed on Feb. 5, 2013, and all the benefits accruing therefrom under 35 U.S.C. §119, the contents of which are incorporated herein by reference in their entirety.

BACKGROUND

1. Field

A separation membrane, a hydrogen separation membrane including the same, and a hydrogen separation device including the hydrogen separation membrane are disclosed.

2. Description of the Related Art

Pd-based metals are used in membranes for selectively separating hydrogen gas from a gas mixture containing the hydrogen gas. The Pd-based metals form a face centered cubic ("FCC") unit cell, and selectively separate hydrogen by dissolving and diffusing the hydrogen through a space in the unit cell. However, the Pd-based metals are expensive and have a limit in improving permeability, and thus have commercial limitations.

Accordingly, a hydrogen separation membrane having improved hydrogen permeability relative to that of a Pd-based metal and also having a lower cost is increasingly desired.

SUMMARY

An embodiment provides a separation membrane that has excellent hydrogen permeability characteristics, reduced hydrogen embrittlement fractures, and low cost.

Another embodiment provides a hydrogen separation membrane including the separation membrane.

Yet another embodiment provides a hydrogen separation device including the hydrogen separation membrane.

According to an embodiment, provided is a separation membrane including an alloy of a Group 5 element, iron (Fe), and aluminum (Al), wherein the alloy includes a body-centered cubic ("BCC") lattice structure.

The Group 5 element may be vanadium (V), niobium (Nb), or a combination of V and Nb.

Specifically, the Group 5 element may be V.

In the separation membrane, the alloy may include less than about 20 atomic percent (atom %) Fe, and less than about 30 atom % Al, each based on a total content of the alloy.

Specifically, the alloy may include about 1 atom % to about 15 atom % Fe, and about 3 atom % to about 25 atom % Al, each based on a total content of the alloy.

More specifically, the alloy may include about 3 atom % to about 10 atom % Fe and about 5 atom % to about 20 atom % Al, each based on a total content of the alloy.

In the separation membrane, greater than or equal to about 80 volume % of the alloy may have a body-centered cubic lattice structure.

Specifically, greater than or equal to about 85 volume % of the alloy may have a body-centered cubic lattice structure.

The separation membrane may have a non-porous dense layer structure and have a porosity of less than about 1 volume percent (volume %), based on a total volume of the separation membrane.

Specifically, the separation membrane may have porosity of less than about 0.5 volume %, and more specifically, about 0 volume %, each based on a total volume of the separation membrane.

The alloy may further include an additional metal selected from Ni, Co, Mn, Cu, or a combination thereof.

The additional metal may be included in an amount of about 0.1 atom % to about 10 atom %, based on a total content of the alloy.

Specifically, the additional metal may be included in an amount of about 1 atom % to about 5 atom %, based on a total content of the alloy.

The separation membrane may have a thickness of about 1 micrometer ($\mu m$) to about 500 $\mu m$.

According to another embodiment, a hydrogen separation membrane including the separation membrane is provided.

The hydrogen separation membrane may have hydrogen solubility (H/M) of about 0.01 to about 0.5 under a hydrogen pressure of about 0.1 to about 1 megaPascal (MPa) at about 400° C.

The hydrogen separation membrane may have hydrogen solubility (H/M) of about 0.1 to about 0.4 under a hydrogen pressure of about 0.7 MPa (about 7 bar) at about 400° C.

The hydrogen separation membrane may have hydrogen permeability of about $1.0 \times 10^{-8}$ moles per meters-seconds-Pacals$^{1/2}$ (mol/m·s·Pa$^{1/2}$) to about $15.0 \times 10^{-8}$ mol/m·s·Pa$^{1/2}$ at 400° C.

The hydrogen separation membrane may further include a catalyst layer disposed on at least one side of the separation membrane.

The catalyst layer may include Pd, Pt, Ni, Ru, Ir, or a combination thereof, and Cu, Ag, Au, Rh, or a combination thereof.

According to yet another embodiment, a hydrogen separation device includes the hydrogen separation membrane according to the above embodiment, an inlet chamber including an inlet for a mixed gas which includes hydrogen gas, and a discharge chamber including a discharge unit for the separated hydrogen gas, wherein the hydrogen separation membrane is interposed between the inlet and the discharge chamber.

In an embodiment, the hydrogen separation membrane may have a tubular shape, a cylindrical chamber barrier rib having a diameter which is greater than the tubular hydrogen separation membrane may be disposed on an outer surface of the hydrogen separation membrane, a space between the chamber barrier rib and the hydrogen separation membrane may define the inlet chamber, and the discharge chamber for discharging hydrogen may be defined by the tubular hydrogen separation membrane.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
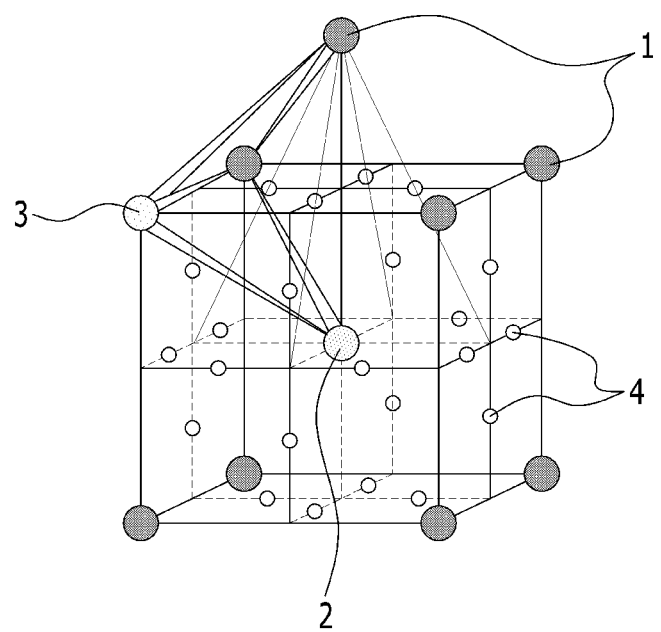
FIG. 1 is a schematic view showing an embodiment of the crystal lattice structure of an embodiment of an alloy in a separation membrane.

This disclosure will be described more fully hereinafter in the following detailed description, in which some but not all embodiments of this disclosure are described. This disclosure may be embodied in many different forms and shall not be construed as limited to the embodiments set forth herein.

As those skilled in the art would realize, the described embodiments may be modified in various different ways, all without departing from the spirit or scope of this disclosure. The size and thickness of each constituent element as shown in the drawings are schematically indicated for better understanding and easy description, and this disclosure is not limited to that shown.

Further, the size and thickness of each constituent element as shown in the drawings may be enlarged for better understanding and easy description, and this disclosure is not limited to that shown. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

According to an embodiment, a separation membrane includes an alloy including at least one Group 5 element, iron, and aluminum, and the alloy may comprise a body-centered cubic (BCC) lattice structure, e.g., about 80 volume % of the alloy may comprise the BCC lattice structure.

The separation membrane may be used to selectively separate a specific gas.

For example, the separation membrane may be a hydrogen separation membrane.

Recently, hydrogen has been spotlighted as a clean energy source. As for a separation membrane for selectively separating hydrogen from hydrogen-containing gases, various metal/metal alloys, silica/zeolite ceramics, metal ceramic composites (cermet), carbon-based materials, polymer separation membranes, and the like are known. Among these materials, representatively, a Pd-based alloy separation membrane is commercially used, as provided in Chem. Rev., 107, 4078-4110, 2007, the content of which is included herein by reference in its entirety. However, Pd, which is included in the Pd-based alloy, is a noble metal and is expensive, and even the Pd-based alloy has only about 2 to 3 times improved hydrogen separation performance. The Pd-based alloys representatively include Pd—Ag23, Pd—Cu40, and the like, as provided in Platinum Metals Rev., 21, 44-50, 1977, the content of which is included herein by reference in its entirety.

Accordingly, research on Group 5 metals such as vanadium (V), niobium (Nb), and tantalum (Ta) is being actively undertaken as an alternative to the Pd-based alloy separation membrane. These metals have larger affinity for hydrogen than the Pd, and thus have excellent hydrogen-containing capability, an excellent hydrogen diffusion characteristics through a small lattice of a body-centered cubic ("BCC") lattice structure, and can have about 10 to 100 times the hydrogen permeability of the Pd-based alloys, as provided in J. Membr. Sci., 362, 12-28, 2010, the content of which is included herein by reference in its entirety.

However, these metals have a hydrogen embrittlement problem in which the metals are broken due to formation of a hydride (a hydride phase) when hydrogen is included under operation conditions of a high temperature and a high pressure despite the aforementioned excellent permeability.

In order to solve the hydrogen embrittlement problem, an embodiment provides a separation membrane having excellent hydrogen permeability and that is fabricated with a low cost by alloying a Group 5 metal.

The separation membrane includes the alloy of an inexpensive metal such as Fe and Al, and has hydrogen permeability comparable to that of a separation membrane comprising a noble metal such as Pd, Pt, or Ir. In addition, the separation membrane includes a Group 5 metal and maintains low hydrogen solubility, and thus may suppress the hydrogen embrittlement and maintain high hydrogen permeability. Furthermore, the separation membrane includes an alloy wherein greater than or equal to about 80 volume % thereof forms a body-centered cubic lattice structure, and thereby may have no performance degradation problem due to crystallization of an amorphous metal but excellent durability compared with an amorphous metal-based separation membrane. In addition, the separation membrane secures equivalent ductility to that of a pure Group 5 metal, and thus may be fabricated to be thin but have a large area in a cold rolling method with a low cost.

An inexpensive alloy metal alternative for decreasing the amount of hydrogen in a pure Group 5 metal, for example, in vanadium (V), is found through an experiment of respectively adding 5 atom % of various transition elements to the vanadium (V). As a result of the experiment, Fe and Al turn out to decrease hydrogen solubility (refer to FIG. 3A). On the other hand, Cr, Mo, and W may be well alloyed with V but have no effect of decreasing hydrogen solubility of the V. In addition, the Fe further decreases the hydrogen solubility of the V metal than Ni when used in the same amount.

Such metals which decrease hydrogen solubility, such as Fe and Ni, decrease the lattice constant of a mother metal and thus bring about a solid solution hardening effect and embrittle an alloy. Herein, the metals have an embrittlement fracture problem when the alloy has a volume expansion during the dissolving of the hydrogen. When the metals have less ductility and become brittle, the metals have a much lower threshold concentration for the hydrogen solubility where an embrittlement fracture occurs.

Figure 4A:
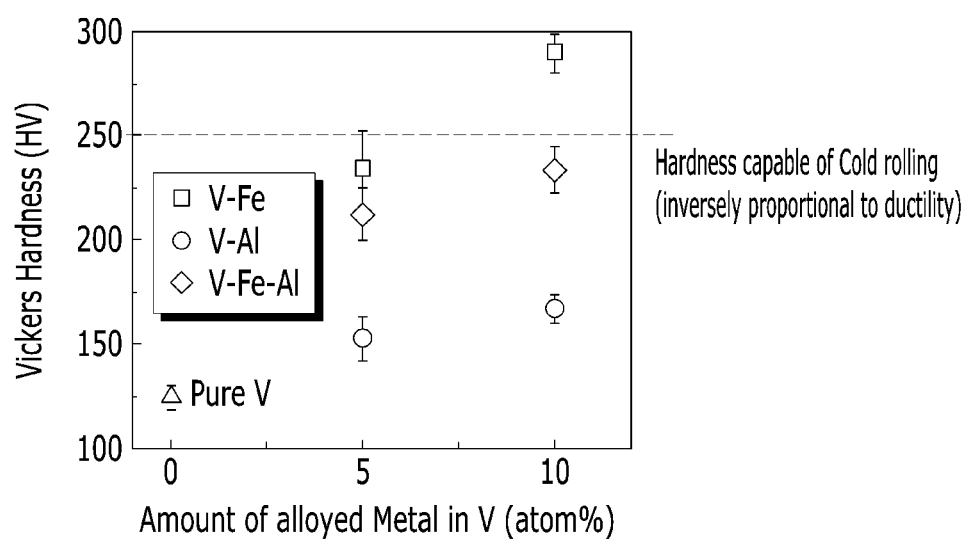
FIG. 4A is a graph of Vickers Hardness (HV) versus the amount of alloyed metal in V (atomic percent, atomic %) showing an increasing alloy hardness trend of an alloy prepared by respectively increasing the addition amount of Fe, Al, or Fe along with Al to V.

Accordingly, among the metals reducing the hydrogen solubility, Al, which is understood to maintain ductility is added in various concentrations to V (vanadium) as the Group 5 metal as shown in FIG. 4A. For example, when 5 atom % and 10 atom % of the Al are respectively added to the V, hardness of alloys is not increased significantly. Unlike the Al, when Fe as a metal for reducing hydrogen solubility is respectively added in an amount of 5 atom % and 10 atom % to V and alloyed with the V, hardness is considerably increased. As a result, the Al is an appropriate metal for decreasing hydrogen solubility of an alloy and maintaining its ductility.

Accordingly, V-5Al and V-10Al alloys prepared by respectively adding 5 atom % and 10 atom % of Al to pure V, V-5Fe and V-10Fe alloys prepared by respectively adding 5 atom % and 10 atom % of Fe to V, a V-2.5Fe-2.5Al alloy prepared by respectively adding 2.5 atom % of Al and 2.5 atom % of Fe to V, and a V-5Fe-5Al alloy prepared by adding 5 atom % of Al and 5 atom % of Fe to V as well as pure V are analyzed by pressure-composition-isotherm ("PCT") analysis. As a result, V-2.5Fe-2.5Al prepared by alloying 2.5 atom % of Fe and 2.5 atom % of Al with V and V-5Fe-5Al prepared by alloying 5 atom % of Fe and 5 atom % of Al with V have remarkably low hydrogen solubility compared with alloys prepared by respectively alloying Fe or Al with V or pure V as shown in FIG. 3B.

Figure 4B:
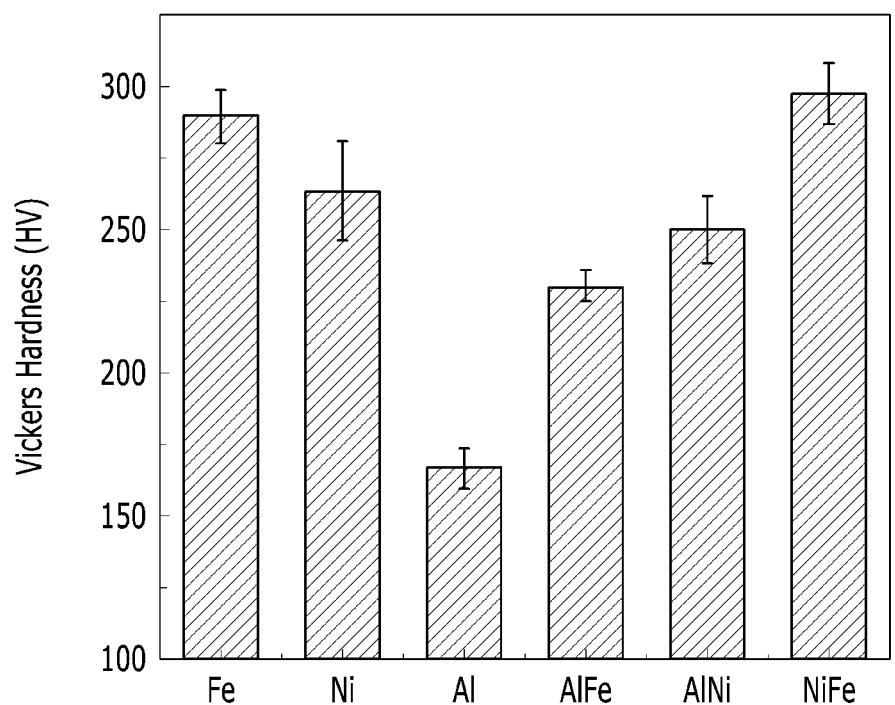
FIG. 4B is a graph comparing Vickers hardness (HV) of hydrogen separation membranes alloyed with Fe, Ni, Al, Al and Fe (AlFe), Al and Ni (AlNi), or Ni and Fe (NiFe), respectively, by adding about 10 atom % of each metal or metal composite to V, based on the total content of the resulting separation membrane.

In addition, FIG. 4B shows hardness results of alloys prepared by respectively adding 10 atom % of Fe, Ni, and Al to a vanadium (V), an AlFe alloy prepared by adding 5 atom % of Al and 5 atom % of Fe to V, an AlNi alloy prepared by adding 5 atom % of Al and 5 atom % of Ni to V, and an NiFe alloy prepared by adding 5 atom % of Ni and 5 atom % of Fe to V. Based on the graph, the alloy prepared by adding only Al to V maintains the lowest ductility, and the AlFe alloy may maintain the lowest ductility considering mutual combination of Fe, Ni, or Al for reducing hydrogen solubility.

Figure 3A:
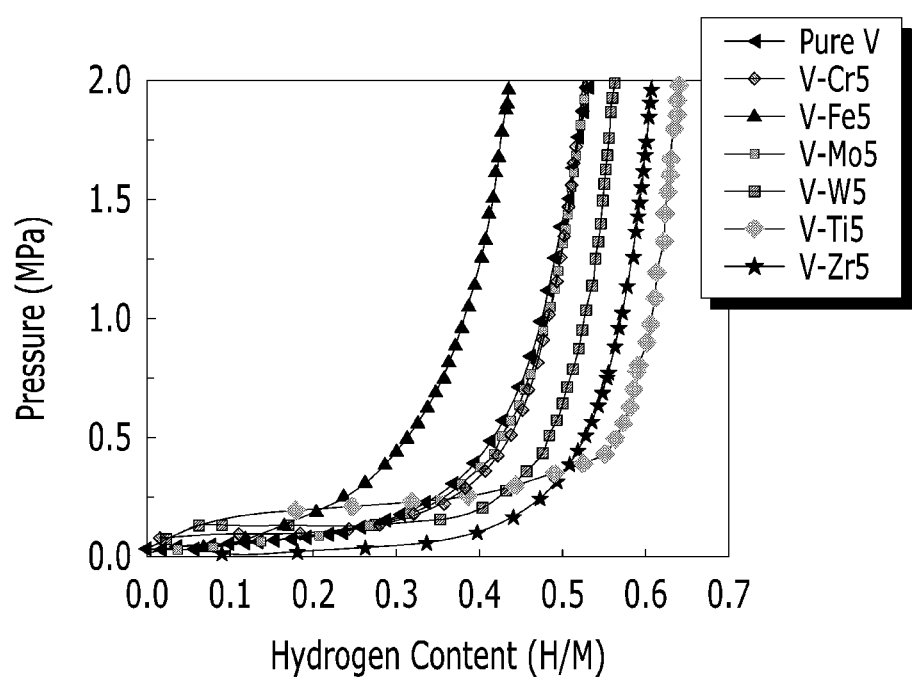
FIG. 3A is a graph of pressure (megaPascals, MPa) versus hydrogen content (hydrogen to metal mole ratio, H/M) showing pressure-composition-isotherm ("PCT") evaluation results of alloys prepared by adding various transition elements to vanadium (V)
Figure 3B:
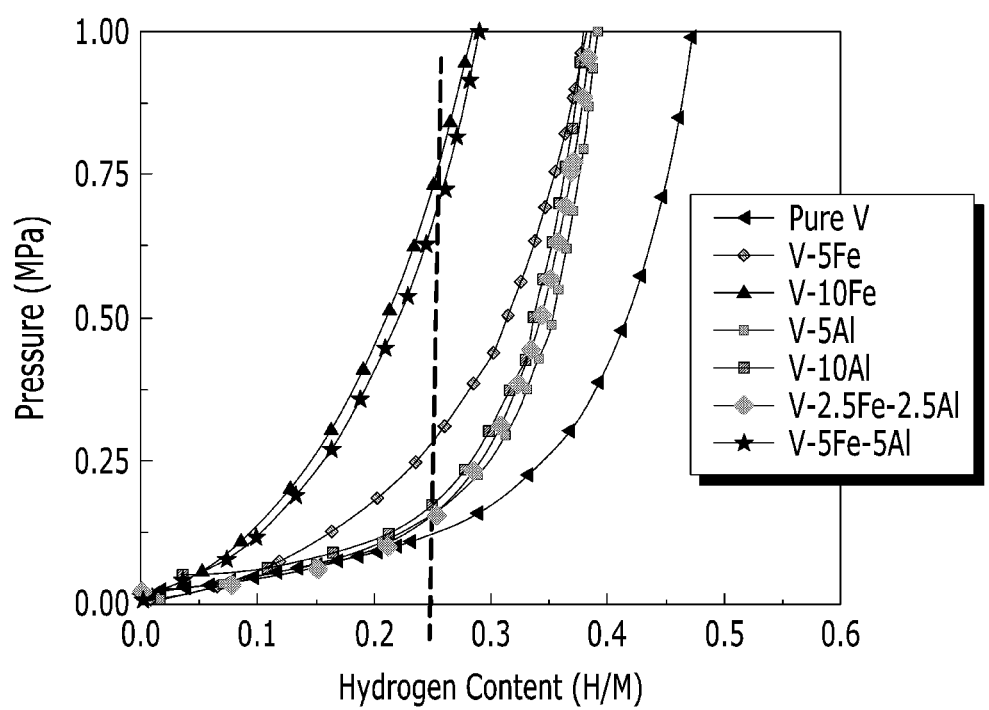
FIG. 3B is a graph of pressure (MPa) versus hydrogen content (H/M) comparing the Al ductility maintenance effect of alloys prepared by varying the addition amounts of Fe and Al to V and that of other alloys prepared by respectively varying the addition amounts of Al and Fe to V with that of pure V.

In other words, the alloy prepared by alloying both Fe and Al with V, a Group 5 element, maintains the lowest hydrogen solubility as shown in FIG. 3B, and simultaneously, the lowest ductility as shown in FIG. 4B.

Accordingly, an embodiment provides a separation membrane including an alloy prepared by alloying Fe and Al with a Group 5 element, and greater than or equal to about 80 volume % of the alloy has a BCC structure. FIG. 1 schematically shows the BCC structure of the alloy in the separation membrane. FIG. 1 also shows each metal component included in the lattice structure of the alloy.

The Group 5 element may be vanadium (V), niobium (Nb), or a combination of V and Nb.

Specifically, the Group 5 element may be vanadium (V).

The V has a smaller metal lattice than the Nb and thus may have lower hydrogen solubility than the Nb under the same condition.

As for each element forming the alloy, Fe may be included in an amount of less than about 20 atom %, specifically, about 1 atom % to about 15 atom %, and more specifically, about 3 atom % to about 10 atom %, and Al may be included in an amount of less than 30 atom %, specifically, about 3 atom % to about 25 atom %, and more specifically, about 5 atom % to about 20 atom %, each based on a total content of the alloy. When Fe and Al are included within the range, the alloy has low hydrogen solubility and maintains ductility, and thus may suppress hydrogen embrittlement.

The separation membrane may further include at least one additional metal selected from Ni, Co, Mn, Cu, or a combination thereof, in the alloy.

The additional metal may be included in an amount of about 0.1 atom % to about 10 atom %, based on the total content of the alloy.

The separation membrane may be easily fabricated to be about 1 to about 500 μm thick in a low-cost process such as cold rolling and the like, but is not limited thereto, as long as the alloy maintains ductility.

According to another embodiment, a hydrogen separation membrane including the separation membrane is provided. The hydrogen separation membrane is a separation membrane that selectively separates hydrogen gas from a gas mixture containing the hydrogen gas and has a body-centered cubic lattice structure capable of suitably diffusing the hydrogen and thus has suitable hydrogen permeability. As a result, the hydrogen separation membrane may separate hydrogen with high purity. For example, greater than or equal to about 80 volume % of the alloy may have the body-centered cubic lattice structure in the hydrogen separation membrane. A hydrogen separation membrane that has a crystal structure to a high degree within the above range may be useful for separating hydrogen.

The hydrogen separation membrane may be applied for selectively permeating and separating $H_2$ gas out of a gas mixture including $H_2$, $CO_2$, CO, and the like, e.g., a gas that is produced through steam reformation, coal gasification, a water gas shift ("WGS") reaction, and the like. For example, the hydrogen separation membrane may be applied to a high purity hydrogen generator, a hydrogen regenerator for a fuel cell, a separation membrane for separating hydrogen out of a mixed gas in a gasification combined thermal power plant, a separation membrane for separation $H_2/CO_2$, and the like.

The separated hydrogen may be used for generating electric power as a clean energy source or as a chemical raw material ($NH_4$, an olefin, and the like) or for purifying petroleum. Also, after removing the hydrogen, a residual gas consists of a $CO_2$ component in a high concentration. Accordingly, the $CO_2$ rich gas may be selectively collected and stored to remove $CO_2$ therein.

While not wanting to be bound by theory, it is understood that the hydrogen separation membrane first adsorbs hydrogen gas ($H_2$) among various gases including the hydrogen. The adsorbed hydrogen gas ($H_2$) is dissociated into hydrogen atoms (H) on the surface of the hydrogen separation membrane, and the dissociated hydrogen atoms (H) are permeated through the hydrogen separation membrane. The hydrogen atoms (H) are dissolved and diffused through the tetrahedral or octahedral interstitial spaces of the unit cells of the separation membrane, and are thus permeated, as taught in M. D. Dolan, J. Membrane Science 362, 12-28, 2010, the content of which is incorporated herein by reference in its entirety. The hydrogen atoms (H) permeated through the membrane are recombined again to form hydrogen gas ($H_2$), and then desorbed and separated from the hydrogen separation membrane.

FIG. 1 is a schematic view showing a crystal lattice type included in the separation membrane, which may be formed by an alloy including at least one Group 5 element, Fe, and Al. While not wanting to be bound by theory, as shown in FIG. 1, it is understood that the Group 5 element 1 is positioned on several vertexes of a body centered cubic structure, Al 2 is alloyed and positioned in the center of the body centered cubic structure, and Fe 3 is positioned on one vertex of the body centered cubic structure. In other words, the separation membrane has the body-centered cubic lattice structure defined by the Group 5 element, Fe, and Al.

The alloy of the separation membrane may further include the aforementioned additional metal 4, and the additional metal along with the Group 5 element, Fe, and Al may form the body-centered cubic lattice structure.

The separation membrane may have a non-porous dense layer structure with porosity of less than about 1 volume % to about 0 volume %, based on a total volume of the separation membrane. Thus, the separation membrane selectively permeates and separates only a material to be separated. If the separation membrane is applied to a hydrogen separation membrane, the separation membrane may have a dense layer structure and selectively separate hydrogen.

While not wanting to be bound by theory, it is understood that a separation membrane consisting of a pure Group 5 element forms a metal hydride during hydrogen permeation and may become embrittled, which is referred to as "hydrogen embrittlement." When an external stress is applied to the embrittled part, hydrogen embrittlement fractures may result. The hydrogen embrittlement fractures may be suppressed by lowering hydrogen solubility. The separation membrane is formed by alloying a Group 5 element with a metal capable of decreasing hydrogen solubility, for example, Fe and Al, and thus may remarkably decrease hydrogen solubility and hydrogen embrittlement fractures due to ductility maintenance of the Al compared with the separation membrane including a pure Group 5 element and a separation membrane including an alloy of a Group 5 element with only either one of Fe or Al. When the Fe and Al are alloyed to form the crystal structure shown in FIG. 1, the alloy may change a bonding energy of a hydrogen atom with a Group 5 element, and resultantly decrease hydrogen solubility. The hydrogen solubility refers to a concentration of hydrogen dissolved in a metal, and is calculated as a mole ratio (H/M) of the dissolved hydrogen (H) to the metal (M).

For example, a V—Fe—Al alloy including Fe and Al elements in an amount of about 5 atom % respectively has about −0.25 eV of hydrogen solubility energy in a high hydrogen concentration region (H/Nb has a mole ratio of about 0.5) according to density functional theory ("DFT"), which has a smaller absolute value than about −0.4 eV of pure Nb. Accordingly, the V—Fe—Al alloy has lower hydrogen solubility.

Accordingly, the separation membrane has lower hydrogen solubility by alloying a Group 5 element with Fe and Al. In addition, this separation membrane cost may be low and it may have an excellent hydrogen separation characteristic by using an inexpensive metal such as Fe and Al instead of a noble metal such as Pb and Nb.

Furthermore, the separation membrane may include each alloy component in various addition amounts in accordance with desired characteristics thereof. Specifically, the separation membrane may include the Fe element in an amount of less than about 20 atom %, specifically, about 1 atom % to about 15 atom %, and more specifically, about 3 to about 10 atom %, based on a total content of the alloy. On the other hand, the Al element may be included in an amount of about 30 atom %, specifically, about 5 atom % to about 25 atom %, and more specifically, about 5 atom % to about 20 atom % in the separation membrane, based on a total content of the alloy. When the Fe and Al elements are included within the range, the separation membrane has less hydrogen embrittlement fractures and thus has better durability as well as excellent hydrogen permeability, and also a low cost. Accordingly, the separation membrane may be usefully applied to a hydrogen separation membrane.

The separation membrane may comprise, for example, a 4 component-based alloy or a 5 component-based alloy that further includes an additional metal in addition to the Group 5 element, Al, and Fe. The additional metal may be selected from Ni, Co, Mn, Cu, or a combination thereof. When the additional metal is further included, the separation membrane may have lower hydrogen solubility and higher ductility.

The additional metal may also form a body-centered cubic lattice structure together with the Group 5 element, Fe, and Al in the alloy. The alloy further including the additional metal may partly form an intermetallic compound, and may form a body-centered cubic lattice structure. Accordingly, the separation membrane including the alloy further including the additional metal may also have the body-centered cubic lattice structure, wherein greater than or equal to about 80 volume % of the alloy has the body-centered cubic lattice structure.

When the separation membrane further includes the additional metal, the additional metal may be included in an amount of about 0.1 to about 10 atom %, based on the total content of the separation membrane.

As is further described above, a hydrogen separation membrane manufactured using the separation membrane may have low hydrogen solubility, specifically, hydrogen solubility of about 0.01 to about 0.5, and more specifically, about 0.05 to about 0.45, when measured under a hydrogen pressure of about 0.1 to about 1 MPa at about 400° C. More specifically, the hydrogen solubility may be about 0.1 to about 0.4 under a hydrogen pressure of about 0.7 MPa (about 7 bar) at about 400° C.

Accordingly, a hydrogen separation membrane manufactured using the above separation membrane has excellent hydrogen permeability. The hydrogen permeability may be calculated according to the following equation.

$$\text{Permeability} = (J \times L)/(\sqrt{P_{H2,in}} - \sqrt{P_{H2,out}})  \quad \text{Equation 1}$$

In Equation 1, J is Flux, L is thickness of a separation membrane, $P_{H2,in}$ is a hydrogen feeding pressure, and $P_{H2,out}$ is a hydrogen permeation pressure.

The separation membrane may have hydrogen permeability of about $1.0 \times 10^{-8}$ mol/m·s·Pa$^{1/2}$ to about $15.0 \times 10^{-8}$ mol/m·s·Pa$^{1/2}$, specifically, about $1.2 \times 10^{-8}$ mol/m·s·Pa$^{1/2}$ to about $12.0 \times 10^{-8}$ mol/m·s·Pa$^{1/2}$, and more specifically, about $1.5 \times 10^{-8}$ mol/m·s·Pa$^{1/2}$ to about $10.0 \times 10^{-8}$ mol/m·s·Pa$^{1/2}$.

The separation membrane may have a thickness of about 1 to about 500 μm, and specifically, about 10 to about 100 μm. When the separation membrane has a thickness within the range, it may have sufficient permeability for use as a separation membrane. The thickness may be the thickness of a hydrogen separation membrane 23 in FIG. 9 or the thickness of a hydrogen separation membrane tube 33 in FIG. 9.

The separation membrane may be manufactured using a known method of manufacturing an alloy, the details of which may be determined by one of skill in the art without undue experimentation. For example, the separation membrane may be manufactured by uniformly dissolving each metal in a method of arc melting, induction melting, and the like and conducting hot rolling/cold rolling, deposition, and plating processes to manufacture a membrane with a desired thickness.

The separation membrane according to an embodiment may have particularly excellent ductility, and may thus be manufactured by a low-cost process such as a cold rolling.

Figure 2:
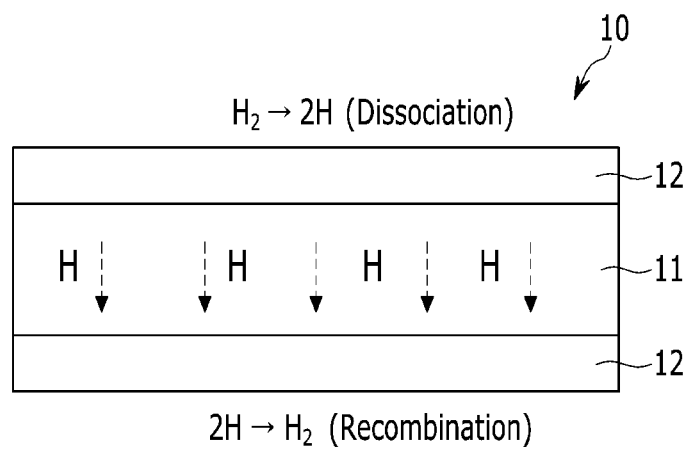
FIG. 2 is a schematic view showing an embodiment of a mechanism in which hydrogen gas is separated through a hydrogen separation membrane.

The hydrogen separation membrane may further include a catalyst layer disposed on one side or both sides thereof. FIG. 2 shows a hydrogen separation membrane 10 including catalyst layers 12 disposed on both sides of a separation membrane 11, and schematically shows a mechanism for passing hydrogen gas $H_2$ through the hydrogen separation membrane. As described above, since hydrogen permeation through the hydrogen separation membrane 10 is achieved by hydrogen atoms, hydrogen molecules ($H_2$) are understood to be dissociated into hydrogen atoms (H). The catalyst layer 12 may function as a catalyst for promoting the dissociation of hydrogen molecules. The hydrogen atoms passed and selectively permeated through the hydrogen separation membrane 10 are understood to recombine into hydrogen molecules, which may also be accelerated by the catalyst layer 12.

The catalyst layer 12 may comprise a material suitable as a catalyst for dissociation of the hydrogen molecules or recombination into hydrogen molecules on the surface of the hydrogen separation membrane 10 without limitation, and specifically, may include Pd, Pt, Ru, Ir, or a combination thereof and Cu, Ag, Au, Rh, or a combination thereof.

The catalyst layer 12 may have a thickness of about 20 to about 1000 nm, and specifically, about 50 to about 500 nm. When the catalyst layer 12 has a thickness within the above range, it may smoothly function as a catalyst without inhibiting permeability of the entire hydrogen separation membrane 10.

According to another embodiment, a hydrogen separation device that includes the hydrogen separation membrane according to the above embodiment, a chamber equipped with an inlet for a mixed gas including hydrogen gas, and a discharge chamber including a discharge unit for the separated hydrogen gas permeated through the hydrogen separation membrane is provided.

The hydrogen separation membrane is disposed between the inlet chamber on one surface and the discharge chamber on the other surface of the hydrogen separation membrane.

Figure 9:
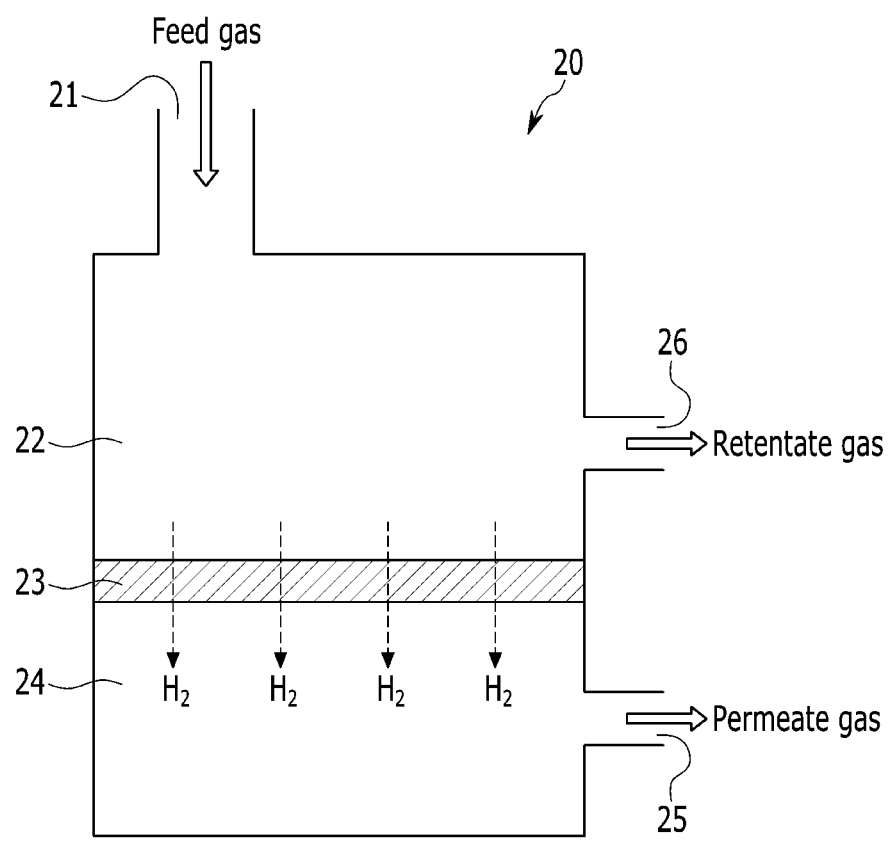
FIG. 9 is a schematic view showing an embodiment of a hydrogen separation device.

FIG. 9 is a schematic view showing an embodiment of a hydrogen separation device 20. If a mixed gas including hydrogen gas is introduced into an inlet chamber 22 through an inlet 21, only the hydrogen gas of the mixed gas is selectively separated into a discharge chamber 24 through the hydrogen separation membrane 23. The separated hydrogen gas may be recovered through an outlet 25. The hydrogen separation device 20 may further include a recovery unit 26 for recovering a residual gas in the inlet chamber 22, after the hydrogen is separated from the inlet chamber 22. The hydrogen separation device 20 is shown in a schematic form for better comprehension and easy description, and may further include additional constitutional components if desired.

Figure 10:
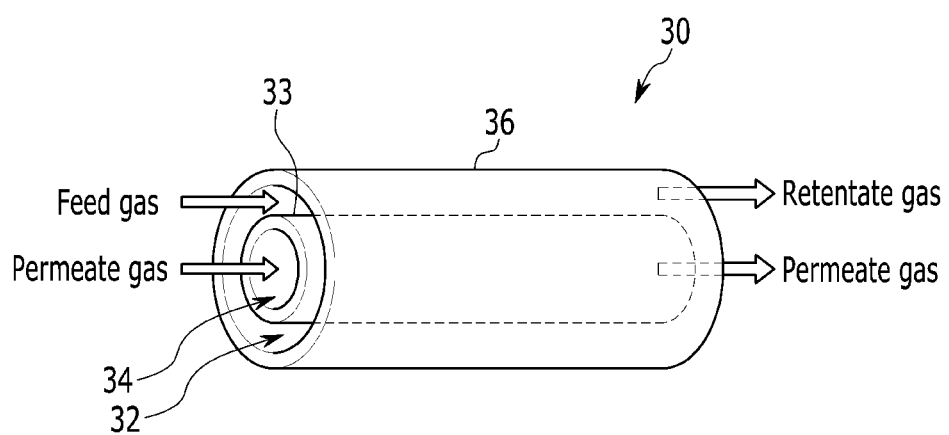
FIG. 10 is a schematic view showing an embodiment of a hydrogen separation device including a tubular separation membrane.

FIG. 10 is a schematic view showing another embodiment of a hydrogen separation device 30 having a tubular shape. The hydrogen separation device 30 may include a tubular hydrogen separation membrane 33, and a cylindrical chamber barrier rib 36 with a larger diameter than that of the tubular hydrogen separation membrane, which is disposed outside, e.g., on an outer surface of the hydrogen separation membrane 33. In this case, a space between the chamber barrier rib 36 and the hydrogen separation membrane 33 may be formed as an inlet chamber 32, and a discharge chamber 34 for discharging hydrogen is formed inside the tubular hydrogen separation membrane. The inlet chamber 32 may be equipped with an inlet for supply of a mixed gas including hydrogen gas (not shown), and a recovery unit (not shown) for recovering residual gas after the hydrogen gas is separated from the inlet chamber 32. Further, the discharge chamber 34 may be equipped with an outlet for the separated hydrogen gas (not shown).

According to another embodiment, a hydrogen separation device includes a tubular hydrogen separation membrane 33, so that a mixed gas may be supplied inside the tubular hydrogen separation membrane 33, and hydrogen from the mixed gas may pass through the tubular hydrogen separation membrane 33 and be separated to the outside the hydrogen separation membrane 33 to discharge the hydrogen, contrary to the one in FIG. 10. In other words, the inside of the hydrogen separation membrane 33 is formed as a chamber where a mixed gas is supplied, and the outside of the hydrogen separation membrane 33 is formed as a discharge chamber where hydrogen is discharged.

Hereinafter, this disclosure is illustrated in more detail with reference to examples and comparative examples. However, they are exemplary examples, and this disclosure is not limited thereto.

EXAMPLES

Preparation Example 1

Manufacture of Hydrogen Separation Membrane

A 400 μm-thick hydrogen separation membrane is fabricated by adding a metal element (i.e., Al, Cr, Fe, Mo, W, Ti, and/or Zr) in various ratios based on a vanadium (V) element and uniformly dissolving and alloying the metal element therein by arc melting. In addition, a hydrogen separation membrane according to a comparative example is fabricated by dissolving vanadium (V) or palladium (Pd) by the same arc melting method as in the preparation example.

Specifically, the elements are measured and put in an arc melter, and oxygen is completely removed from the arc melter by providing a high vacuum state (less than or equal to $2 \times 10^{-5}$ Torr). Next, Ar gas is injected into the arc melter to provide an oxidation inhibiting environment, and then the above materials are melted by increasing a current, and then naturally cooled in the arc melter. The prepared ingot is made to be 400 μm thick and heat-treated in a high vacuum furnace to remove a defect such as a surface contaminant, an internal stress fracture, a dislocation, and the like. Then, Pd is coated at a thickness of 150 nm on both sides of the heat-treated membrane, thereby fabricating a hydrogen separation membrane for measuring hydrogen permeability.

Experimental Example 1

Alloy Having Hydrogen Solubility Decrease Effect

A hydrogen solubility decrease effect of an alloy prepared by adding a metal element to a Group 5 metal is examined through a pressure-composition-isotherm ("PCT") experiment.

Each alloy hydrogen separation membrane, fabricated by respectively adding 5 atom % of selected transition elements (Cr, Fe, Mo, W, Ti, or Zr) to vanadium (V) metal according to Preparation Example 1, is evaluated regarding hydrogen solubility at 400° C. depending on a hydrogen pressure with reference to JIS H7201 "Method for measurement of pressure-composition-temperature (PCT) relations of hydrogen absorbing alloys," the content of which is incorporated herein by reference. The evaluation is performed using a Sievert-type PCT (pressure-composition-isotherm) equipment, and the results are provided in FIG. 3A.

As shown in FIG. 3A, addition of Cr, Mo, and W have almost no hydrogen solubility decrease effect. On the contrary, inclusion of Fe decreases hydrogen solubility in proportion to the added amount.

Experimental Example 2

Alloy Having Ductility Maintenance Effect

The alloy separation membranes are measured regarding Vickers hardness to indirectly examine if the metal element maintains ductility of the vanadium (V) metal. In general, a metal having higher hardness is known to be brittle and have less ductility. A vanadium (V) alloy is measured regarding hardness by arc-melting an alloy sample into a water droplet shape and rubbing one side thereof with sandpaper, unlike Preparation Example 1. The alloy samples are rubbed on the surface with a fine, e.g., 600 grit, sandpaper and then measured regarding hardness using a hardness meter capable of applying a weight of 1 kilogram (kg).

Referring to FIG. 4A, a vanadium (V) alloy prepared by adding Al thereto has the least increased hardness. Accordingly, the Al-containing alloy has the best ductility. As for Fe, an alloy including 5 atom % of Fe has significantly increased hardness and decreased ductility.

FIG. 4B is a graph showing ductility change of each alloy prepared by respectively adding 10 atom % of Fe, Ni, Al, Al and Fe (AlFe), Al and Ni (AlNi), and Ni and Fe (NiFe) to V, based on the total content of the resulting alloy. The vanadium (V) metal alloy including 10 atom % Al maintains the best ductility, the alloy including 5 atom % of the Al and 5 atom % of Fe (AlFe) is the second best. When the Al metal is included in an amount of greater than or equal to 5 atom %, the alloy has no solubility decrease effect due to lattice expansion. Accordingly, a three component-based alloy, V-5Fe-5Al, prepared by adding 5 atom % of Al and 5 atom % of Fe to V, rather than 10 atom % of Al to V, has much decreased solubility and provides suitable ductility. FIG. 4A shows the aforementioned result. In other words, the three component-based alloy prepared by adding Fe and Al to V provides ductility suitable for cold rolling even though the total amount of Fe and Al is up to 10 atom %, unlike the alloy including only Fe.

Experimental Example 3

Hydrogen Solubility Evaluation

An alloy of V-5Al or V-5Fe prepared by respectively adding 5 atom % or 10 atom % of Al to vanadium (V), an alloy of V-5Fe or V-10Fe prepared by respectively adding 5 atom % or 10 atom % of Fe to vanadium (V), an alloy of V-5Fe-5Al prepared by adding 5 atom % of Al along with 5 atom % of Fe to vanadium (V), and an alloy of V-2.5Fe-2.5Al prepared by 2.5 atom % of Al along with 2.5 atom % of Fe to vanadium (V) according to Experimental Examples 1 and 2 as well as a pure vanadium (V) separation membrane are measured regarding hydrogen PCT (pressure-composition-isotherm) at 400° C. The PCT is measured in the same method as aforementioned in Experimental Example 1.

As shown in FIG. 3B, the alloys, V-2.5Fe-2.5Al and V-5Fe-5Al, prepared by adding Fe and Al to a Group 5 element (V), have remarkably lower hydrogen solubility than the alloys prepared by respectively adding Fe or Al to V or pure V.

The alloys including 5 atom % of Al and 5 atom % of Fe and also including 2.5 atom % of Al and 2.5 atom % of Fe have hydrogen solubility (H/M) of less than 0.25 under a condition of 400° C. and 7 bar (0.7 MPa). In general, an alloy having hydrogen solubility (H/M) of less than or equal to 0.25 is known to suppress hydrogen embrittlement fractures of the vanadium (V) metal therein under the same condition of 400° C. and 7 bar (0.7 MPa).

Experimental Example 4

Maintenance of Body Centered Cubic Structure

An alloy desirably maintains the body centered cubic structure of vanadium (V) to provide the hydrogen diffusion characteristics despite addition of Al to increase ductility.

The hydrogen separation membranes (pure V, V-5Fe, V-10Fe, V-5Al, V-10Al, V-2.5Fe-2.5Al, and V-5Fe-5Al) according to Preparation Example 1 are analyzed by X-ray diffraction ("XRD") at room temperature (about 25° C.) to examine their crystal structures. The results are provided in FIG. 5.

Figure 5:
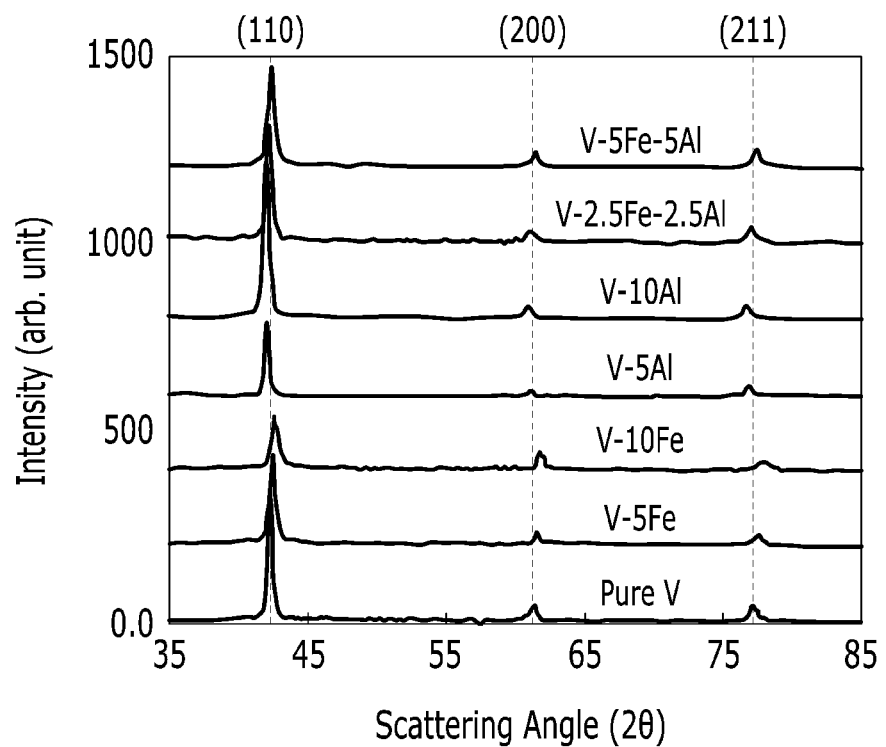
FIG. 5 is a graph of intensity (arbitrary units) versus scattering angle (degrees two-theta, 2θ) showing XRD results of alloys prepared by adding the various amounts of Al, Fe, or both Al and Fe to V, as well as pure V, which are measured at room temperature.

As shown in FIG. 5, all metals maintained a BCC lattice structure. Herein, the Al increases the lattice size of V, while the Fe decreases the lattice size of the V. The alloys prepared by adding 5 atom % of Al and 5 atom % of Fe to V and 2.5 atom % of Al and 2.5 atom % of Fe to V have a similar lattice size to that of pure V, since lattice expansion of the alloys are traded off with a contraction effect thereof.

Experimental Example 5

Hydrogen Permeability

The hydrogen separation membranes formed of pure V, V-10Fe, V-10Al, and V-5Fe-5Al according to Preparation Example 1 are calculated regarding hydrogen permeability according to the following Equation 1.

$$\text{Permeability} = (J \times L)/(\sqrt{P_{H_2,in}} - \sqrt{P_{H_2,out}}) \qquad \text{Equation 1}$$

In Equation 1, Flux (J) is a hydrogen permeation rate per unit area, L is a thickness of a hydrogen separation membrane, and $(P_{H2,in})^{1/2} - (P_{H2,out})^{1/2}$ is a difference between the square roots of hydrogen partial pressures of hydrogen input and output of the hydrogen separation membrane.

Figure 6:
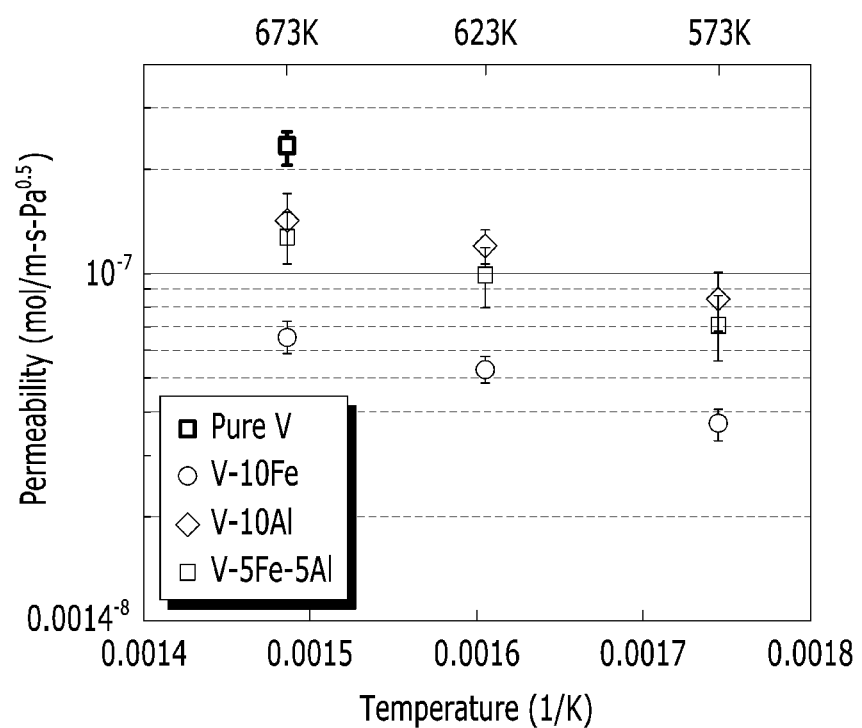
FIG. 6 is a graph of permeability (mol/m·s·Pa$^{1/2}$) versus inverse temperature (1/Kelvin) showing hydrogen permeability of pure V, a V-10Fe alloy prepared by adding about 10 atom % of Fe to V, a V-10Al alloy prepared by adding about 10 atom % of Al to V, and a V-5Fe-5Al alloy prepared by adding about 5 atom % of Al and about 5 atom % of Fe to V, based on the total content of the alloy, which is measured at a temperature ranging from about 573 K to about 673 K.

FIG. 6 is a graph showing hydrogen permeability of the hydrogen separation membranes obtained according to the Equation 1 at a temperature ranging from 573 K to 673 K.

Referring to FIG. 6, an Al-containing alloy hydrogen separation membrane has very high hydrogen permeability of greater than $1.0 \times 10^{-7}$ mol m$^{-1}$ s$^{-1}$ Pa$^{-0.5}$ at 673 K. However, the V-5Fe—Al alloy hydrogen separation membrane including 5 atom % of Fe instead of 5 atom % of Al has almost the same hydrogen permeability as the V-10Al alloy hydrogen separation membrane. As shown in FIG. 3A, the V-5Fe—Al alloy hydrogen separation membrane has similar hydrogen solubility to the V-10Fe alloy separation membrane at 673 K. Therefore, the hydrogen permeability result shows that the addition of Fe and Al has a composite influence on hydrogen solubility and hydrogen diffusivity of a hydrogen separation membrane, and thus brings about the aforementioned hydrogen permeability.

Figure 8:
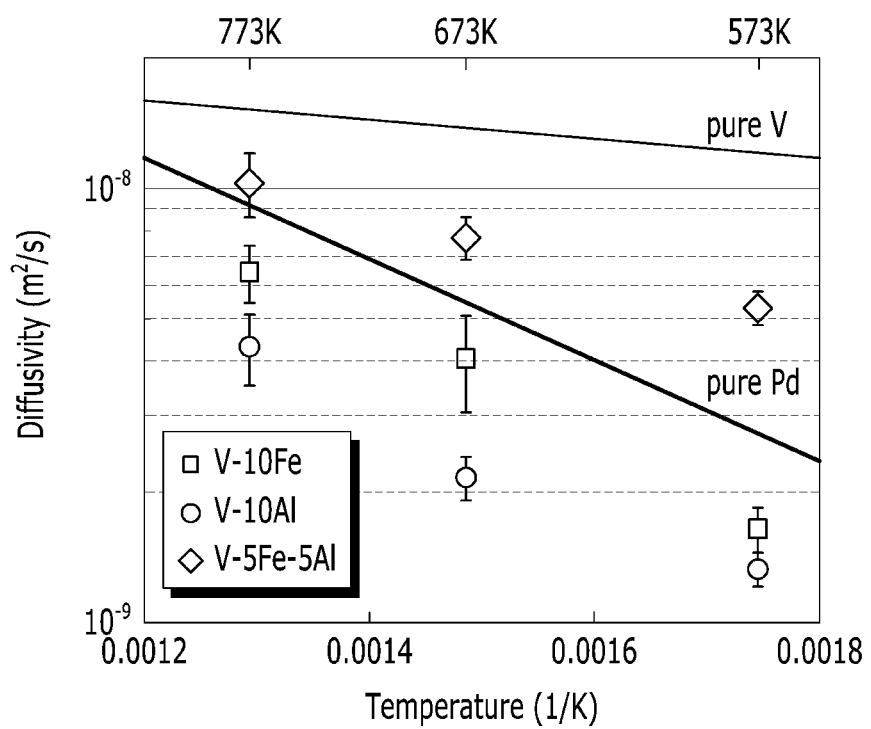
FIG. 8 is a graph of diffusivity (square meters per second, m$^2$/s) versus inverse temperature (1/Kelvin) showing hydrogen diffusivity of the hydrogen separation membranes made of the pure V, the pure Pd, the V-10Fe alloy prepared by adding about 10 atom % of Fe to V, the V-10Al alloy prepared by adding about 10 atom % of Al to V, and the V-5Fe-5Al alloy prepared by adding about 5 atom % of Al and about 5 atom % of Fe to V depending on temperature change.

FIG. 8 is a graph showing hydrogen diffusivity of the hydrogen separation membrane at a temperature ranging from 573 K to 773 K. The hydrogen diffusivity coefficient is determined in a time-lag method as described in J. Alloys Compd. 321 2001 17 by K. Yamakawa, the content of which is incorporated herein by reference in its entirety. As shown in FIG. 8, all of the alloy hydrogen separation membranes have lower hydrogen permeability than the pure V separation membrane. However, the V-5Fe-5Al alloy hydrogen separation membrane has a much higher hydrogen diffusivity coefficient than the V-10Al alloy hydrogen separation membrane or the V-10Fe alloy hydrogen separation membrane. As aforementioned, the hydrogen permeability result shown in FIG. 6 is obtained by combining the hydrogen diffusivity shown in FIG. 8 and the hydrogen solubility shown in FIG. 3A.

Experimental Example 6

Hydrogen Embrittlement Fractures

The pure V, V-10Fe, V-10Al, and V-5Fe-5Al hydrogen separation membranes according to Preparation Example 1 are measured regarding hydrogen permeability, while cooled down from 350° C. to room temperature. The results are provided in FIG. 7. The hydrogen permeability is measured by maintaining the hydrogen separation membranes at 400° C. under a hydrogen pressure of 7 bar for 4 hours and cooling down to room temperature at a rate of 5° C./min.

Figure 7:
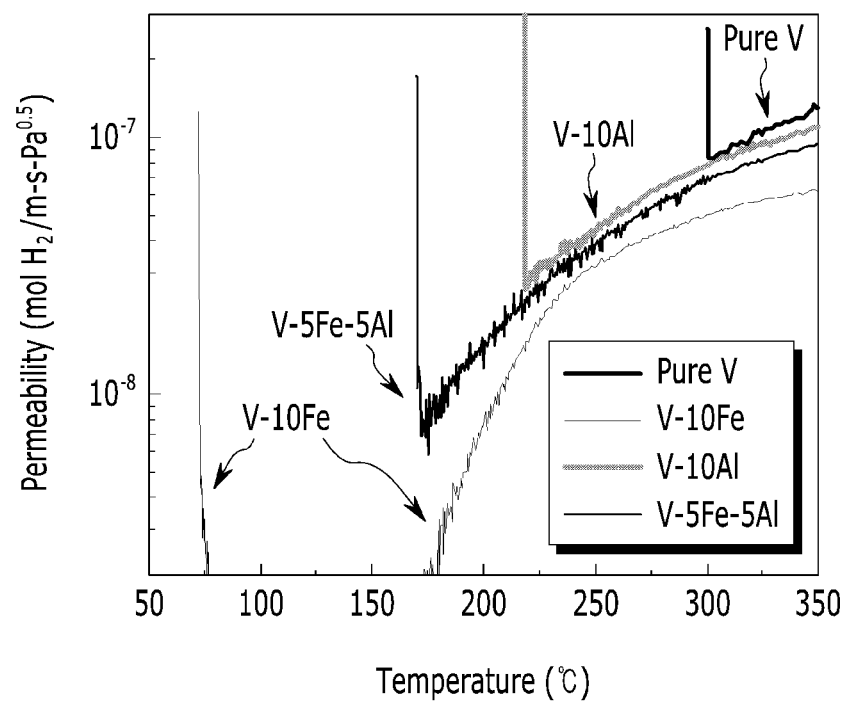
FIG. 7 is a graph of permeability (mol/m·s·Pa$^{1/2}$) versus temperature (° C.) showing hydrogen permeability of each hydrogen separation membrane respectively made of the pure V, the V-10Fe alloy prepared by adding about 10 atom % of Fe to V, the V-10Al alloy prepared by adding about 10 atom % of Al to V, and the V-5Fe-5Al alloy prepared by adding about 5 atom % of Al and about 5 atom % of Fe to V, which is measured according to temperature change by cooling down the hydrogen separation membranes from about 400° C. to room temperature.

As shown in FIG. 7, the pure V hydrogen separation membrane has a membrane fracture (rapidly permeability increase) at around 275° C. due to hydrogen embrittlement fractures, while the V-5Fe-5Al alloy hydrogen separation membrane has an embrittlement fracture at a low temperature of less than or equal to 150° C. The embrittlement temperature decrease of the hydrogen separation membrane shows that the alloy may be exposed to a hydrogen environment at a high temperature for a long period.

While this disclosure has been described in connection with what is presently considered to be practical exemplary embodiments, it is to be understood that the invention is not limited to the disclosed embodiments, but, on the contrary, includes various modifications and equivalent arrangements included within the spirit and scope of the appended claims.

What is claimed is:

1. A separation membrane comprising:
an alloy consisting of a Group 5 element, iron (Fe), and aluminum (Al),
wherein an amount of the aluminum (Al) is less than or equal to 5 atomic percent, and an amount of sum of the iron (Fe) and the aluminum (Al) is less than or equal to 10 atomic percent, based on a total content of the alloy, and
wherein the alloy comprises a body-centered cubic lattice structure.

2. The separation membrane of claim 1, wherein the Group 5 element is vanadium (V), niobium (Nb), or a combination of V and Nb.

3. The separation membrane of claim 1, wherein the Group 5 element is V.

4. The separation membrane of claim 1, wherein the alloy consists of 5 atomic percent Fe, 5 atomic percent Al, and 90 atomic percent vanadium (V), based on a total content of the alloy.

5. The separation membrane of claim 1, wherein the alloy consists of 2.5 atomic percent Fe, 2.5 atomic percent Al, and 95 atomic percent vanadium (V), based on a total content of the alloy.

6. The separation membrane of claim 1, wherein greater than or equal to about 80 volume percent of the alloy has a body-centered cubic lattice structure.

7. The separation membrane of claim 1, wherein greater than or equal to about 90 volume percent of the alloy has a body-centered cubic lattice structure.

8. The separation membrane of claim 1, wherein the separation membrane has porosity of less than about 1 volume percent, based on a total volume of the separation membrane.

9. The separation membrane of claim 1, wherein the separation membrane has a thickness of about 1 micrometer to about 500 micrometers.

10. A hydrogen separation membrane comprising the separation membrane according to claim 1.

11. The hydrogen separation membrane of claim 10, wherein the hydrogen separation membrane has hydrogen solubility of about 0.01 to about 0.5, when measured under conditions of about 0.1 to about 1 megaPascals hydrogen pressure and about 400 °C.

12. The hydrogen separation membrane of claim 10, wherein the hydrogen separation membrane has hydrogen solubility of about 0.1 to about 0.4, when measured under conditions of about 0.7 megaPascals hydrogen pressure and about 400 °C.

13. The hydrogen separation membrane of claim 10, wherein the hydrogen separation membrane has a hydrogen permeability of about $1.0 \times 10^{-8}$ mol/m·s·Pa$^{1/2}$ to about $15.0 \times 10^{-8}$ mol/m·s·Pa$^{1/2}$ at 400° C.

14. The hydrogen separation membrane of claim 10, wherein the hydrogen separation membrane further comprises a catalyst layer disposed on at least one side of the separation membrane.

15. The hydrogen separation membrane of claim 14, wherein the catalyst layer comprises Pd, Pt, Ni, Ru, Ir, or a combination thereof, and Cu, Ag, Au, Rh, or a combination thereof.

16. A hydrogen separation device comprising:
the hydrogen separation membrane according to claim 10;
an inlet chamber comprising an inlet for a mixed gas which comprises hydrogen gas; and
a discharge chamber including a discharge unit for separated hydrogen gas,
wherein the hydrogen separation membrane is interposed between the inlet chamber and the discharge chamber.

17. The hydrogen separation device of claim 16, wherein the hydrogen separation membrane has a tubular shape,
a cylindrical chamber barrier rib having a diameter which is greater than a diameter of the tubular hydrogen separation membrane is disposed on an outer surface of the hydrogen separation membrane,
an inner surface of the cylindrical chamber barrier rib and an outer surface of the hydrogen separation membrane define an inlet chamber, and
an inner surface of the tubular hydrogen separation membrane defines a discharge chamber for hydrogen discharge.

* * * * *